US012756266B1

(12) United States Patent
Suematsu

(10) Patent No.: US 12,756,266 B1
(45) Date of Patent: Oct. 6, 2026

(54) POWER GENERATION DEVICE

(71) Applicants: Applied-Energy-Laboratory, Ltd, Nagano (JP); Suiso Power Co., Ltd., Tokyo (JP)

(72) Inventor: Mitsuru Suematsu, Nagano (JP)

(73) Assignee: APPLIED-ENERGY-LABORATORY, LTD., Nagano (JP)

( * ) Notice: Subject to any disclaimer, the term of this patent is extended or adjusted under 35 U.S.C. 154(b) by 0 days.

(21) Appl. No.: 19/434,715

(22) Filed: Dec. 29, 2025

Related U.S. Application Data

(63) Continuation of application No. 19/400,229, filed on Nov. 25, 2025.

(30) Foreign Application Priority Data

Nov. 17, 2025 (JP) ................................ 2025-196947

(51) Int. Cl.
*H02K 7/02* (2006.01)
*H02K 7/10* (2006.01)
*H02K 7/18* (2006.01)

(52) U.S. Cl.
CPC ............ *H02K 7/02* (2013.01); *H02K 7/1004* (2013.01); *H02K 7/1853* (2013.01)

(58) Field of Classification Search
CPC ....... H02K 7/02; H02K 7/1004; H02K 7/1853
See application file for complete search history.

(56) References Cited

U.S. PATENT DOCUMENTS 5,124,605 A * 6/1992 Bitterly ................ F16F 15/305 310/90.5
2008/0223636 A1* 9/2008 Gutsche ................. F03G 7/122 180/65.31
2023/0138936 A1* 5/2023 Walker, III .......... H02K 7/1853 310/74

FOREIGN PATENT DOCUMENTS

CN 220749011 U * 4/2024

* cited by examiner

*Primary Examiner* — Forrest M Phillips
(74) *Attorney, Agent, or Firm* — Stetina Garred Brucker & Newboles

(57) ABSTRACT

To provide a power generation device with a configuration that can simplify a drive system, obtain stable rotational force and rotational speed, and easily adjust a flywheel. A power generation device 1 includes a housing 2, a motor 3 having a first shaft 11, a flywheel 4 having a second shaft 12, a generator 5 having a third shaft 13, and a transmission device 6 that transmits rotational force from the second shaft 12 to the third shaft 13. A rotor 3*a* is attached to the first shaft 11. The flywheel 4 has a ring-shaped weight 7 detachably attached to a main body 4*a*. The main body 4*a* has a protruding portion 4*b* where a part of a disc shape protrudes. The rotor 3*a* contacts the protruding portion 4*b* to rotate the flywheel 4, thereby transmitting the rotational force to the third shaft 13 via the transmission device 6 to cause the generator 5 to generate electricity.

6 Claims, 5 Drawing Sheets

POWER GENERATION DEVICE

CROSS-REFERENCE TO RELATED APPLICATIONS

The present application is a continuation of U.S. application Ser. No. 19/400,229 filed Nov. 25, 2025, which claims priority to Japanese Patent Application No. 2025-196947 filed on Nov. 17, 2025, the disclosures of which are incorporated herein by reference.

STATEMENT RE: FEDERALLY SPONSORED RESEARCH/DEVELOPMENT

Not Applicable

BACKGROUND

1. Field of the Invention

The present invention relates to a power generation device equipped with a flywheel.

2. Description of the Related Art

Conventionally, power generation devices utilizing flywheels have been proposed (Patent Document 1: JP 2011-259561 A, Patent Document 2: JP 2017-106431 A, Patent Document 3: JP 2024-090270 A).

BRIEF SUMMARY

The prior art described in Patent Documents 1-3 has a complex drive system due to its structure of uniformly applying external energy to rotate a disc. Additionally, it is necessary to adjust the disc weight according to the energy accumulated in the disc. However, discs made by casting or forging are difficult to adjust the flywheel, and when it is desired to further increase the energy accumulated in the flywheel, new manufacturing equipment is required, presenting various challenges.

The present invention has been made in view of the above circumstances, and aims to provide a power generation device with a configuration that can simplify the drive system, obtain stable rotational force and rotational speed, and easily adjust the flywheel.

The problem is solved by the solution disclosed below as one embodiment.

A power generation device according to the present invention includes: a housing; a motor having a first shaft; a flywheel having a second shaft; a generator having a third shaft; and a transmission device that transmits a rotational force of the second shaft to the third shaft, wherein a rotor is attached to the first shaft; the flywheel has a main body and a ring-shaped weight detachably attached to the main body; the main body has a protruding portion where a part of a disc shape protrudes; and the rotor contacts the protruding portion to rotate the flywheel, thereby transmitting the rotational force to the third shaft via the transmission device, causing the generator to generate electricity.

According to this configuration, stable rotational force and rotational speed can be obtained, and the flywheel can be easily adjusted. Therefore, desired energy can be easily accumulated.

As an example, the transmission part is an endless belt, and the main body has fixing members attached to first through-holes formed at predetermined pitches in the circumferential direction, and the main body and the weight are detachably connected and fixed by the fixing members. According to this configuration, kinetic energy can be efficiently transmitted. Furthermore, since the weight can be easily attached and detached, it is easy to adapt to a configuration capable of accumulating desired energy. Therefore, a configuration with excellent assembly workability and maintainability can be achieved.

As an example, the main body has the first through-holes formed at predetermined pitches in the circumferential direction, the weights have second through-holes and are disposed on both sides of the main body, and the main body and the weights are detachably fastened by fastening members through the first through-holes and second through-holes. According to this configuration, it is easy to adjust the arrangement of the weights to obtain a desired energy storage amount. Therefore, versatility can be easily enhanced.

As an example, an interior angle at which a first line passing through the tip end in the rotational direction of the protruding portion and the center of the second shaft and a second line passing through the rear end in the rotational direction of the protruding portion and the center of the second shaft intersect is set between 30 degrees and 60 degrees. There are a first weight and a second weight heavier than the first weight, and the second weight is disposed in an area forming an exterior angle where the first line and second line intersect, and is disposed only at a first position near the tip end and a second position near the rear end. According to this configuration, it is easy to reach a desired energy storage amount by utilizing gravity in addition to inertial force.

As an example, the transmission device has a drive pulley attached to the second shaft, a driven pulley attached to the third shaft, and a belt stretched between the drive pulley and the driven pulley. The rotor has a tire fitted on a wheel, and the wheel is attached to the first shaft. According to this configuration, a configuration with excellent rotational force transmission efficiency can be achieved.

According to the present invention, a power generation device with a configuration that can obtain stable rotational force and rotational speed and easily adjust the flywheel can be realized.

DETAILED DESCRIPTION

Figure 1:
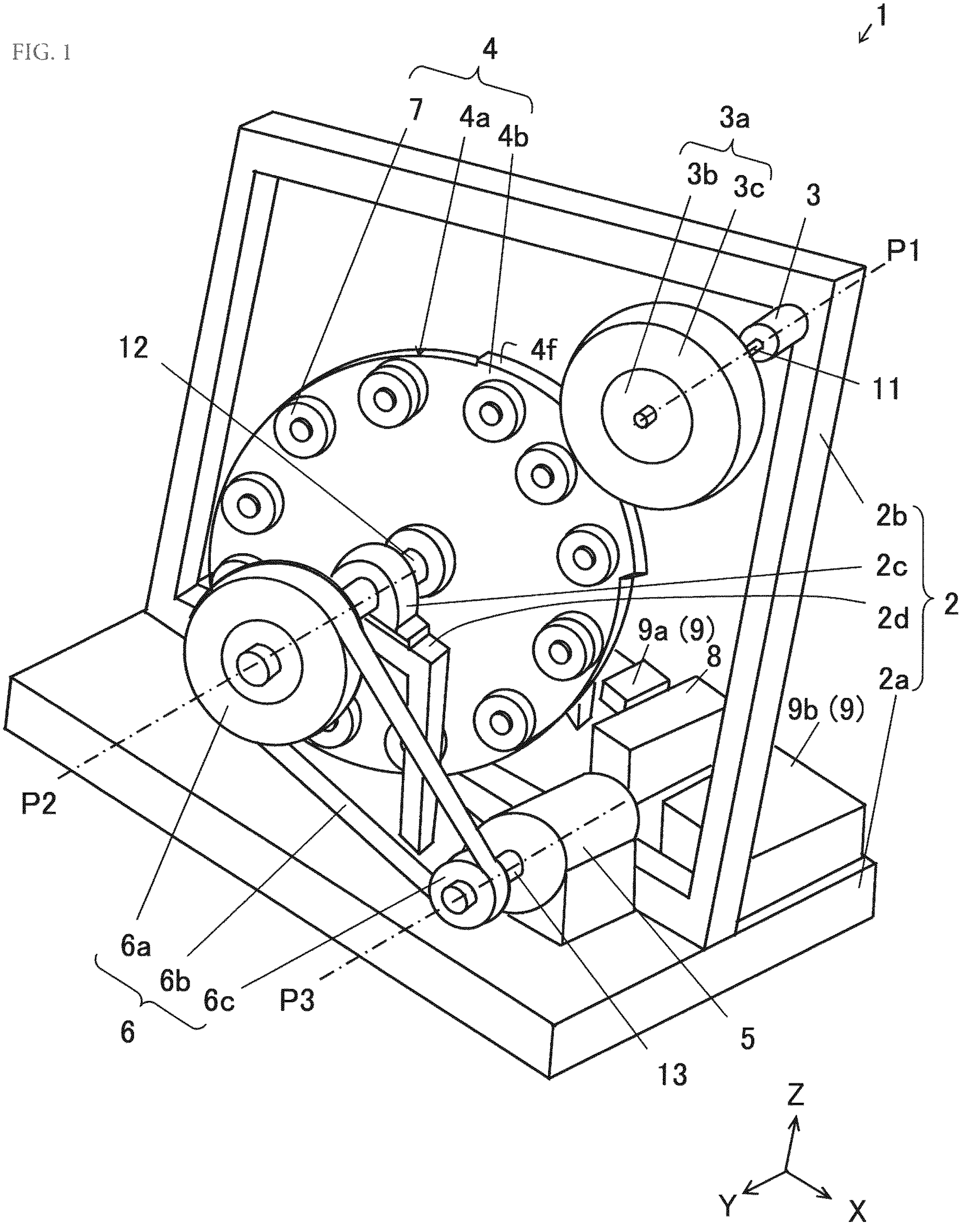
FIG. 1 is a perspective view showing the external appearance of the power generation device according to an embodiment of the present invention.

An embodiment of the present invention will be described in detail below with reference to the drawings. As shown in FIG. 1, the power generating device 1 of this embodiment includes a housing 2, a motor 3 having a first shaft 11, a flywheel 4 having a second shaft 12, a generator 5 having a third shaft 13, and a transmission device 6 that transmits the rotational force of the second shaft 12 to the third shaft 13. A rotor 3*a* is attached to the first shaft 11. The flywheel 4 has annular weights 7 detachably attached to the main body 4*a*. The main body 4*a* has a protruding portion 4*b* that protrudes from a disk-shaped portion. When the rotor 3*a* contacts an outer surface 4*f* of the protruding portion 4*b*, the flywheel 4 rotates, transmitting the rotational force to the third shaft 13 via the transmission device 6, and the generator 5 generates electricity. Note that throughout the drawings illustrating the embodiment, components having the same function are designated by the same reference numerals, and repeated description of such components may be omitted.

The housing 2 includes a base 2*a*, a frame 2*b* to which an electric motor 3 is mounted, a bearing 2*c* that rotatably supports a second shaft 12, and a shaft support 2*d* to which the bearing 2*c* is fixed. A generator 5 is mounted on the base 2*a*. The housing 2 further accommodates a controller 8 and a battery 9.

A rotor 3*a* includes a wheel 3*b* on which a tire 3*c* is fitted, and the wheel 3*b* is mounted on the first shaft 11. According to this configuration, the rotational power of the first shaft 11 can be efficiently transmitted to the second shaft 12. Here, the outer diameter of the rotor 3*a* is smaller than the outer diameter of the flywheel 4. However, this configuration is not limited thereto.

The flywheel 4 smooths the rotational output of the second shaft 12 while storing kinetic energy. The flywheel 4 is made of iron, magnesium alloy, aluminum alloy, or the like, and is formed through casting, forging, laser machining, or other manufacturing methods.

The transmission device 6 includes a drive pulley 6*a* mounted on the second shaft 12, a driven pulley 6*b* mounted on a third shaft 13, and an endless belt 6*c* stretched between the drive pulley 6*a* and the driven pulley 6*b*. With this configuration, the rotational power of the second shaft 12 can be efficiently transmitted to the third shaft 13. Here, the outer diameter of the driven pulley 6*b* is smaller than that of the drive pulley 6*a*. This configuration is not limited thereto. For example, a transmission device using a chain stretched over two sprockets may also be employed.

A first axis line P1 extending through the first shaft 11 and a second axis line P2 extending through the second shaft 12 are parallel to each other. This configuration enables efficient transmission of rotational power from the first shaft 11 to the second shaft 12. Likewise, the second axis line P2 extending through the second shaft 12 and a third axis line P3 extending through the third shaft 13 are also parallel to each other, enabling efficient transmission of rotational power from the second shaft 12 to the third shaft 13.

The battery 9 includes a first battery 9*a* that supplies power to the motor 3, and a second battery 9*b* that stores electrical energy generated by the generator 5. Here, the capacity of the first battery 9*a* is smaller than that of the second battery 9*b*. However, this configuration is not limited thereto. For example, a single battery 9 may be used to selectively supply power to the motor 3 and store power as the second battery 9*b*. Alternatively, a single battery 9 may simultaneously supply power to the motor 3 and store power as the second battery 9*b*.

Figure 2:
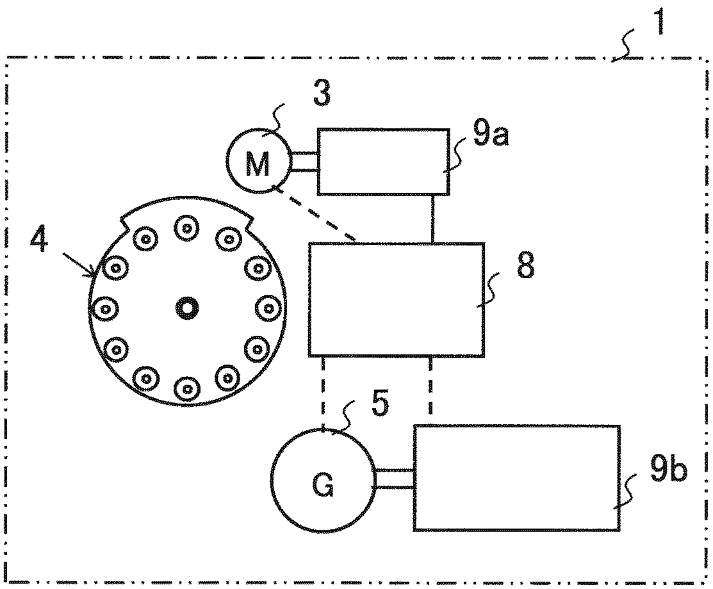
FIG. 2 is a configuration diagram schematically showing the configuration of the power generation device of this embodiment.

FIG. 2 is a schematic structural diagram illustrating the configuration of the power generation device 1 of the present embodiment. The power generation device 1 includes the controller 8 that operates using power supplied from the first battery 9*a*. The controller 8 performs drive control of the motor 3 and generation control of the generator 5. Here, the rated output of the motor 3 is smaller than the rated output of the generator 5.

Description will now be given of various examples of the flywheel 4 according to the present embodiment.

First Example

Figure 3A:
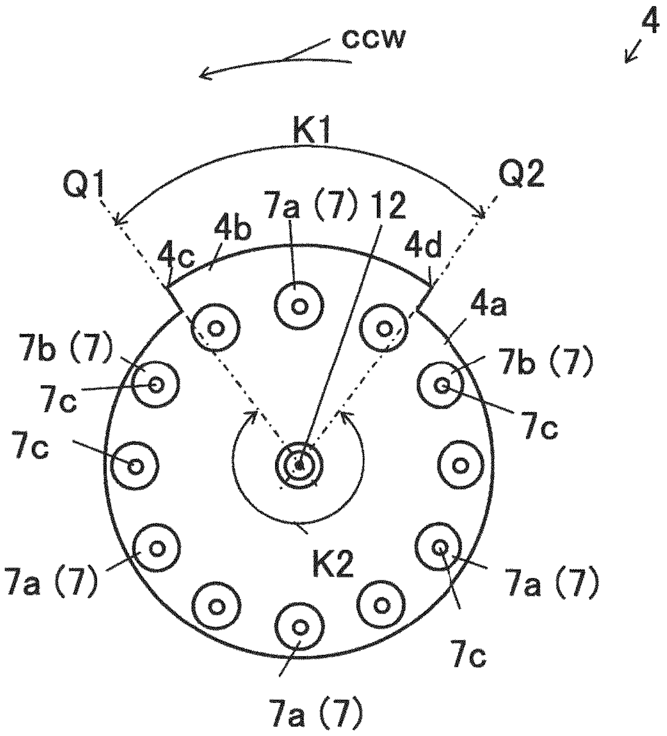
FIG. 3A is a front view schematically showing a first example flywheel of the power generation device of this embodiment.
Figure 3B:
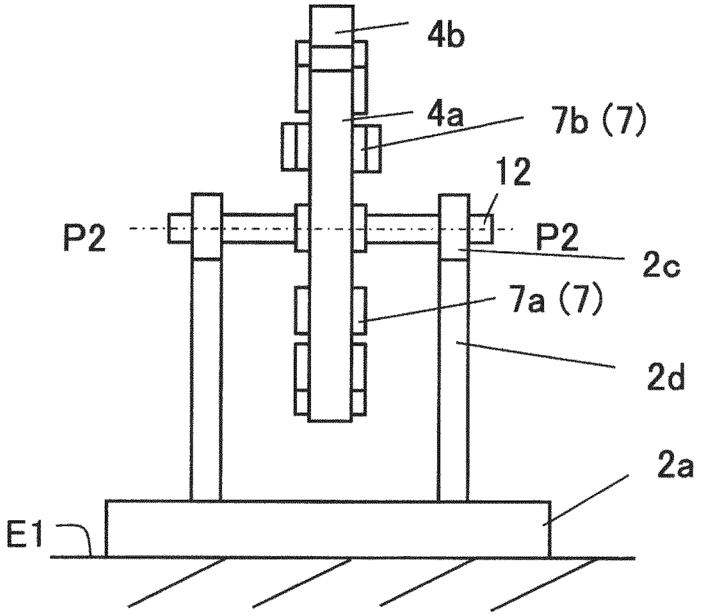
FIG. 3B is a side view schematically showing the arrangement configuration of the flywheel shown in FIG. 3A.
Figure 4A:
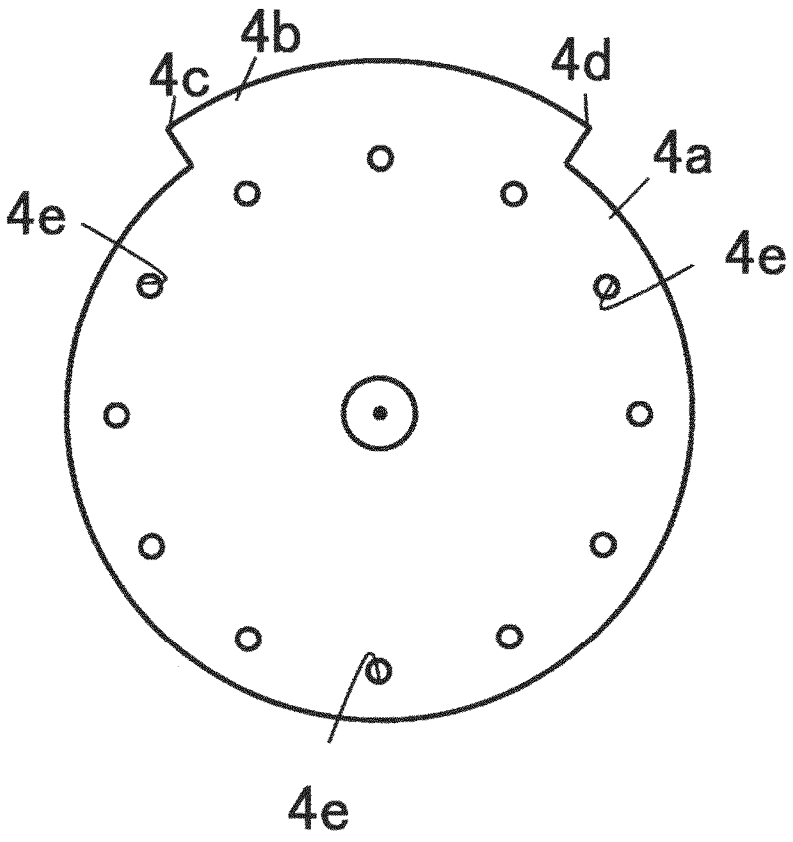
FIG. 4A is a front view schematically showing the main body of the flywheel shown in FIG. 3A.
Figure 4B:
FIG. 4B is a front view schematically showing the weight of the flywheel shown in FIG. 4A.

FIG. 3A is a front view schematically illustrating a flywheel 4 of the first example, and FIG. 3B is a side view schematically illustrating the arrangement of the flywheel 4. FIG. 4A is a front view schematically illustrating a main body 4*a* of the flywheel 4, and FIG. 4B is a front view schematically illustrating a weight 7 of the flywheel 4. The base 2*a* is installed on a ground surface E1. Shaft supports 2*d* are erected vertically with respect to the base 2*a*, and the second shaft 12 is rotatably supported by the bearing 2*c* so as to be parallel to the direction of gravity.

The main body 4*a* has a plurality of first through-holes 4*e* formed at predetermined circumferential pitches. In the illustrated example, twelve first through-holes 4*e* are shown. The weight 7 has a second through-hole 7*e* formed along its axis. The weights 7 are disposed on both sides of the main body 4*a*. The main body 4*a* and the weights 7 are detachably fastened by fastening members 7*c* inserted through the first through-holes 4*e* and the second through-holes 7*e*. As one example, the fastening member 7*c* is a bolt and nut. As another example, the first through-hole 4*e* may be threaded, and the fastening member 7*c* may be a bolt. These configurations are not limiting.

The flywheel 4 rotates in the counterclockwise direction (CCW) around the second axis line P2 of the second shaft 12. A first line Q1 extending through a tip end 4*c* of the protrusion 4*b* and the center of the second shaft 12, and a second line Q2 extending through a rear end 4*d* of the protrusion 4*b* and the center of the second shaft 12 form an interior angle K1 of 30° to 60°. When K1 is 30° or more, the rotational force from the first shaft 11 can be more easily transmitted to the flywheel 4, thereby facilitating rotation of the flywheel 4. When K1 is 60° or less, the flywheel 4 can maintain rotation by inertia more effectively.

The weight 7 includes a first weight 7*a* and a second weight 7*b* heavier than the first weight 7*a*. Here, the second weight 7*b* is formed by stacking two first weights 7*a* in the axial direction, which reduces the number of components. This configuration is not limiting. For example, three first weights 7*a* may be stacked to form the second weight 7*b*. Alternatively, dedicated first and second weights 7*a* and 7*b* may be used.

The second weight 7*b* is disposed within an area in which an exterior angle K2 is formed by the intersection of the first line Q1 and the second line Q2, and is placed only at a first position near the tip end 4*c* and at a second position near the rear end 4*d*. Consequently, the combined action of gravity and inertial force facilitates the accumulation of rotational energy in the flywheel 4.

Second Example

Figure 5A:
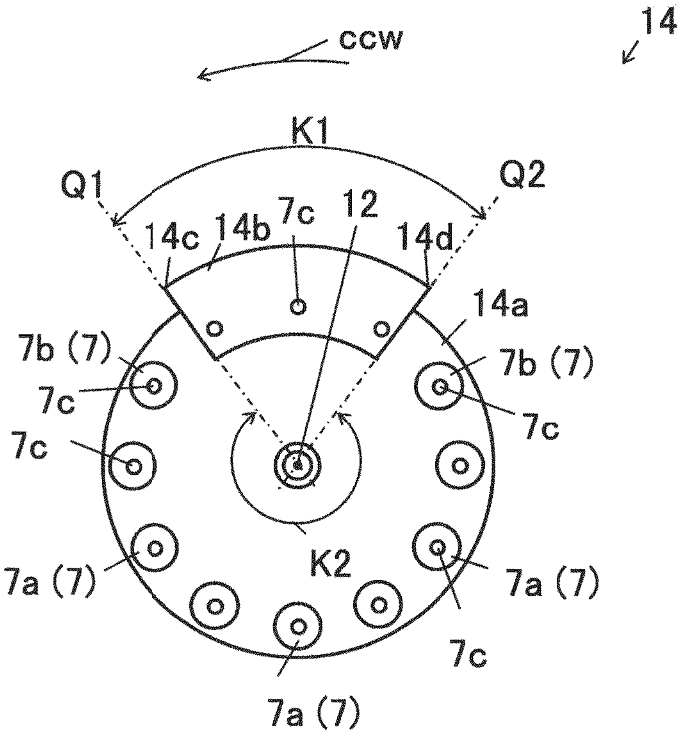
FIG. 5A is a front view schematically showing a second example flywheel of the power generation device of this embodiment.
Figure 5B:
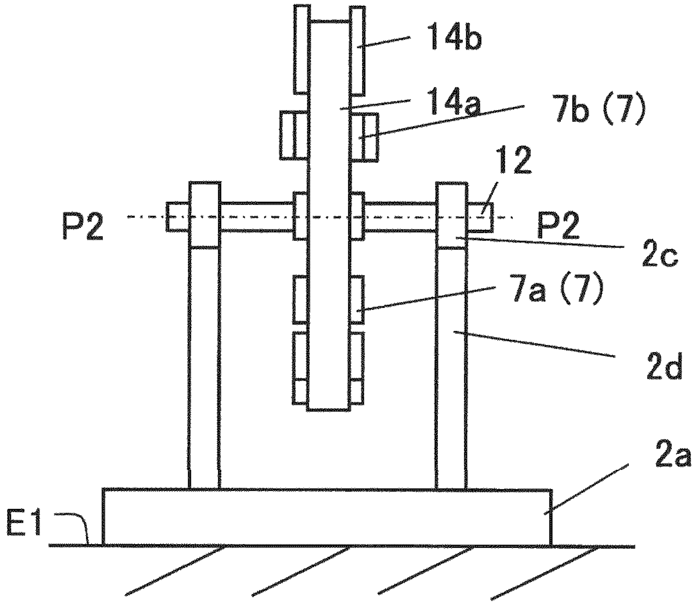
FIG. 5B is a side view schematically showing the arrangement configuration of the flywheel shown in FIG. 5A.

FIG. 5A is a front view schematically illustrating a flywheel 14 of a second example of the power generation device according to the present embodiment, and FIG. 5B is a side view illustrating the arrangement of the flywheel 14. In the second example, the flywheel 14 includes a protrusion 14*b* having a shape obtained by removing a portion of a ring-shaped body. The protrusion 14*b* is disposed on both sides of a disk-shaped main body 14*a* and fixed to the main body 14*a* by fastening members. With this configuration, the size of the main body 14*a* can be easily changed, thereby increasing design flexibility for the energy storage capacity of the flywheel 14.

According to the power generation device 1 of the present embodiment, a stable rotational force and rotational speed can be obtained, and a configuration is provided in which the flywheel 4 (14) can be easily adjusted. With this configuration, a small DC motor having low power consumption can be used to extract the necessary high power from a large AC generator. The present invention is not limited to the above-described embodiments and can be modified in various ways without departing from the spirit and scope of the invention.

EXPLANATION OF REFERENCE NUMERALS

1: Power generation device
2: Housing; 2*a*: Base; 2*b*: Frame body; 2*c*: Bearing; 2*d*: Shaft support body
3: Motor; 3*a*: Rotor
4: Flywheel; 4*a*: Main body; 4*b*: Protruding portion; 4*c*: Tip side; 4*d*: Rear end side; 4*e*: First through-hole; 4*f*: Outer peripheral surface
5: Generator
6: Transmission device; 6*a*: Drive pulley; 6*b*: Driven pulley; 6*c*: Belt
7: Weight; 7*a*: First weight; 7*b*: Second weight; 7*c*: Fastening member; 7*e*: Second through-hole
8: Controller
9: Battery; 9*a*: First battery; 9*b*: Second battery
11: First shaft
12: Second shaft
13: Third shaft
K1: Interior angle
K2: Exterior angle
P1: First axis
P2: Second axis
P3: Third axis
Q1: First line
Q2: Second line

The invention claimed is:

1. A power generation device comprising:
a housing;
a motor having a first shaft;
a flywheel having a second shaft;
a generator having a third shaft; and
a transmission device that transmits rotational force from the second shaft to the third shaft, wherein a rotor is attached to the first shaft;
the flywheel has a main body and a ring-shaped weight detachably attached to the main body;
the main body has a protruding portion where a part of a disc shape protrudes; and
the rotor contacts the protruding portion to rotate the flywheel, thereby transmitting the rotational force to the third shaft via the transmission device to cause the generator to generate electricity.

2. The power generation device according to claim 1, wherein:
the main body has first through-holes formed at predetermined pitches in a circumferential direction;
the weights have second through-holes and are disposed on both sides of the main body; and
the main body and the weights are detachably fastened by fastening members through the first through-holes and the second through-holes.

3. The power generation device according to claim 2, wherein:
an interior angle at which a first line passing through a tip end in a rotational direction of the protruding portion and a center of the second shaft and a second line passing through a rear end in the rotational direction of the protruding portion and the center of the second shaft intersect is set between 30 degrees and 60 degrees;
the weights include a first weight and a second weight heavier than the first weight; and
the second weight is disposed in an area forming an exterior angle where the first line and the second line intersect, and is disposed only at a first position near the tip end and a second position near the rear end.

4. The power generation device according to claim 1, wherein:
the transmission device has a drive pulley attached to the second shaft, a driven pulley attached to the third shaft, and a belt stretched between the drive pulley and the driven pulley; and
the rotor has a tire fitted on a wheel, and the wheel is attached to the first shaft.

5. The power generation device according to claim 2, wherein:
the transmission device has a drive pulley attached to the second shaft, a driven pulley attached to the third shaft, and a belt stretched between the drive pulley and the driven pulley; and
the rotor has a tire fitted on a wheel, and the wheel is attached to the first shaft.

6. The power generation device according to claim 3, wherein:
the transmission device has a drive pulley attached to the second shaft, a driven pulley attached to the third shaft, and a belt stretched between the drive pulley and the driven pulley; and
the rotor has a tire fitted on a wheel, and the wheel is attached to the first shaft.

* * * * *